(12) United States Patent  (10) Patent No.: US 8,284,477 B2
Engheta  (45) Date of Patent: Oct. 9, 2012

(54) LUMPED PLASMONIC "DIODE" AND LUMPED PLASMONIC "RECTIFIER" FOR OPTICAL FIELD RECTIFICATION AND LUMPED OPTICAL SECOND HARMONIC GENERATION

(75) Inventor: Nader Engheta, Wayne, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 573 days.

(21) Appl. No.: 12/444,006

(22) PCT Filed: Oct. 10, 2007

(86) PCT No.: PCT/US2007/021664
§ 371 (c)(1),
(2), (4) Date: Jul. 16, 2009

(87) PCT Pub. No.: WO2008/108824
PCT Pub. Date: Sep. 12, 2008

(65) Prior Publication Data
US 2010/0025708 A1  Feb. 4, 2010

Related U.S. Application Data

(60) Provisional application No. 60/850,857, filed on Oct. 10, 2006.

(51) Int. Cl.
*G02F 2/02* (2006.01)
(52) U.S. Cl. .................................... 359/328; 385/122
(58) Field of Classification Search .................. None
See application file for complete search history.

(56) References Cited

U.S. PATENT DOCUMENTS

| 5,011,250 | A | 4/1991 | Okada et al. |
| 5,231,533 | A | 7/1993 | Gonokami et al. |
| 7,037,729 | B2 | 5/2006 | Nie et al. |
| 7,167,623 | B2 | 1/2007 | Sato et al. |
| 2001/0002315 | A1 | 5/2001 | Schultz et al. |
| 2003/0042487 | A1 | 3/2003 | Sarychev et al. |
| 2008/0044148 | A1* | 2/2008 | Robinson et al. ............ 385/122 |
| 2008/0212920 | A1 | 9/2008 | Engheta et al. |
| 2009/0080297 | A1 | 3/2009 | Engheta et al. |

FOREIGN PATENT DOCUMENTS
WO  WO 2006/091215 A2  8/2006

OTHER PUBLICATIONS

Engheta, N. et al., "Circuit elements at optical frequencies: nano-inducers, nano-capacitors and nano-resistors," Physical Review Letters, 2005, 95(9), 095504, 4 pages.

Engheta, N., "Nanocircuits with Light at Nanoscales: Optical Nanocircuits Inspired by Metamaterials," Science, Sep. 21, 2007, 317, 1698-1702.

(Continued)

*Primary Examiner* — Hemang Sanghavi
(74) *Attorney, Agent, or Firm* — Woodcock & Washburn, LLP

(57) ABSTRACT

A lumped nanocircuit element design at IR and optical frequencies is provided that can effectively act as a lumped "diode" and a lumped "rectifier" for rectifying optical field displacement currents or optical electric field. The lumped nanocircuit element design can also act as a lumped second harmonic generator. The element is formed by juxtaposing an epsilon-negative nanoparticle with a nonlinear optical nanostructure.

6 Claims, 3 Drawing Sheets

OTHER PUBLICATIONS

Alu, A. et al., "Theory of Linear Chains of Metamaterial/Plasmonic Particles as Subdiffraction Optical Nanotransmission Lines," Physical Review B, 2006, 74, 205436, 18 pages.

Alu, A. et al., "Optical nano-transmission lines: synthesis of planar left-handed metamaterials in the infrared and visible regimes," Journal of the Optical Society of America B, 2006, 23, 571-583.

Alu, A. et al., "Three-Dimensional Nanotransmission Lines at Optical Frequencies: A Recipe for Broadband Negative-Refraction Optical Metamaterials," Physical Review B, 2007, 75, 024304, 70 pages.

Alu, A. et al., "Optical Shorting Wire," Optics Express, Oct. 5, 2007, 15(21), 13773-13782.

Alu, A. et al., "Coupling of Optical Lumped Nanocircuit Elements and Effects of Substrates," Optics Express, Oct. 5, 2007, 15(21), 13865-13876.

Silveirinha, M.G. et al., "Nanoinsulators and Nanoconnectors for Optical Nanocircuits," Journal of Applied Physics, 2008, 064305, 24 pages.

Salandrino, A. et al., "Parallel, Series, and Intermediate Interconnections of Optical Nanocircuit Elements: Part I; Analytical Solutions" Journal of the Optical Society of America B, 2007, 3007-3013.

Salandrino, A. et al., "Parallel, Series, and Intermediate Interconnections of Optical Nanocircuit Elements: Part II: Nanocircuit and Physical Interpretations" Journal of the Optical Society of America B, 2007, 3014-3022.

Alu, A. et al., "Design of Nanofilters for Optical Nanocircuits," Physical Review B, 2008, 144107, 12 pages.

Engheta et al., "Nanocircuit Elements, Nano-Transmission Lines and Nano-Antennas Using Plasmonic Materials in the Optical Domain," IEEE International Workshop on Antenna Technology, Mar. 2005, 165-168.

Eleftheriades, G.V. et al., "Planar negative refractive index media using periodically $L$-$C$ loaded transmission lines," IEEE Trans. Microwave Theory and Techniques, 2002, 50(12), 2702-2712.

Engheta, N., et al., "Interaction between plasmonic and non-plasmonic nanospheres and their equivalent nano-circuit elements," Dig. USNC-URSI National Radio Science Meeting, Monterey, CA, 2004, p. 276.

Lamprecht, B., et al., "Surface Plasmon propagation in microscale metal stripes," Appl. Phys.Lett., 2001, 79(1), 51-53.

Liu, L., et al., "Forward coupling phenomena between artificial left-handed transmission lines," J. Appl. Phys., 2002, 92(9), 5560-5565.

Sarychev, D.K., et al., "Periodical arrays of optical nanoantennas," Proceedings of SPIE, Complex Mediums, 5218, 2003, 81-92.

Shvets, G., "Photonic approach to making a material with a negative index of refraction," Phys. Rev. B, 2003, 67, 035109-1-035109-8.

Fontana, E., "Surface Plasmon Resonance on a recordable compact disk," Microwave and Optoelectronics Conference 2003, IMOC 2003, Proceedings of the 2003 SBMO/IEEE MTT-S International vol. 2, Sep. 20-23, 2003, pp. 667-672.

Johnson, P.B., "Optical Constants of the Noble Metals," Phys. Rev. B, Solid State, Dec. 15, 1972, vol. 6, No. 12, pp. 4370-4379.

Genov, D.A. et al., "Metal-dielectric composite filters with controlled spectral windows of transparency," Journal of Nonlinear Optical Physics and Materials World Scientific Singapore, Dec. 2003, 12(4), 419-440.

* cited by examiner

LUMPED PLASMONIC "DIODE" AND LUMPED PLASMONIC "RECTIFIER" FOR OPTICAL FIELD RECTIFICATION AND LUMPED OPTICAL SECOND HARMONIC GENERATION

CROSS-REFERENCE TO RELATED APPLICATIONS

This application is the National Stage of International Application No. PCT/US2007/021664, filed Oct. 10, 2007, which claims the benefit of U.S. Provisional Application No. 60/850,857 filed Oct. 10, 2006. The contents of that application are hereby incorporated by reference in their entirety. The subject matter of the present application is further related to the subject matter of PCT/US2005/021785 filed Jun. 20, 2005, which claims priority to U.S. Provisional Patent Application No. 60/581,016, filed Jun. 18, 2004, entitled "Optical Circuits and Circuit Elements and Method of Forming Same." The subject matter of the present application is also related to the subject matter of PCT/US2006/018140, filed May 10, 2006, which claims priority to U.S. Provisional Patent Application No. 60/679,491, filed May 10, 2005, entitled "Optical Data Storage, Frequency, Modulated Coding and Data Recording Using Plasmonic Nanostructures." The subject matter of these patent applications is incorporated herein by reference.

FIELD OF THE INVENTION

The invention relates generally to a plasmonic lumped "diode" and lumped "rectifier" that, when exposed to an optical electric field, can provide optical field displacement current predominantly rectified in a particular polarity.

BACKGROUND OF THE INVENTION

In an article by N. Engheta, et al. entitled "Circuit elements at optical frequencies: nano-inductors, nano-capacitors and nano-resistors," Physical Review Letters 95, 095504 (2005), the inventors of that application explored and studied the concept of lumped nanocircuit elements such as nanocapacitors, nanoinductors, and nanoresistors at optical frequencies using the plasmonic and non-plasmonic nanoparticles. The concept described therein can provide the possibility of utilizing and extending the concept and mathematical tools of circuit theory, which has traditionally belonged to the radio frequency (RF) and microwave domains, into the THz, IR and optical frequencies, and can open doors to various innovations in future photonic circuits and systems. In another recent article (N. Engheta, "Nanocircuits with Light at Nanoscales: Optical Nanocircuits Inspired by Metamaterials", Science, Vol. 317, pages 1698-1702, Sep. 21, 2007), N. Engheta overviews and envisions nanocircuits at optical frequencies at nanoscale, which can be formed by collections of nanoparticles with various different materials. Using these concepts, the present inventor has also developed the notion of 1-D, 2-D, and 3-D nanotransmission lines in optics that can provide the possibility for photonic metamaterials with negative refraction. The case of 1-D nanotransmission line is discussed by A. Alu and N. Engheta in "Theory of Linear Chains of Metamaterial/Plasmonic Particles as Subdiffraction Optical Nanotransmission Lines" Physical Review B, Vol. 74, 205436 (2006). The case of the 2-D nanotransmission line is discussed by A. Alù and N. Engheta in "Optical nano-transmission lines: synthesis of planar left-handed metamaterials in the infrared and visible regimes," Journal of the Optical Society of America B 23, 571-583 (2006), and the case of 3-D nanotransmission line is discussed by A. Alu and N. Engheta in "Three-Dimensional Nanotransmission Lines at Optical Frequencies: A Recipe for Broadband Negative-Refraction Optical Metamaterials," Physical Review B, Vol 75, 024304 (2007).

Furthermore, several other related concepts have been developed recently. These include the concept of Optical 'Shorting' wire by A. Alu and N. Engheta in "Optical 'Shorting Wire'" Optics Express, Vol. 15, Issue 21, pp. 13773-13782, Oct. 5, 2007; the concept of coupling among lumped nanocircuits, by A. Alu, A. Salanrino, and N. Engheta in "Coupling of Optical Lumped Nanocircuit Elements and Effects of Substrates," Optics Express, Vol. 15, Issue 21, pp. 13865-13876, Oct. 5, 2007; the concept of nanoinsulators and nanoconnectors by M. G. Silveirinha, A. Alu, J. Li, and N. Engheta in "Nanoinsulators and Nanoconnectors for Optical Nanocircuits" posted in http://www.arxiv.org/ftp/condmat/papers/0703/0703600.pdf, 2007; the concept of parallel, series, and intermediate interconnections of optical nanocircuit elements, by A. Salandrino, A. Alu, and N. Engheta in "Parallel, Series, and Intermediate Interconnections of Optical Nanocircuit Elements: Part I: Analytical Solutions" posted in http://www.arxiv.ori/abs/0707.1002; and Part II of this concept by A. Alu, A. Salandrino, and N. Engheta in "Parallel, Series, and Intermediate Interconnections of Optical Nanocircuit Elements: Part II: Nanocircuit and Physical Interpretations" posted in http://www.arxiv.orttabs/0707.1003; and the concept of lumped nanofilters by A. Alu, M. Young, and N. Engheta in "Nanofilters for Optical Nanocircuits" posted in http://www.arxiv.org/ftp/arxiv/papers/0710/0710.0616.pdf, 2007

It is desired to extend such concepts to provide other circuit elements, such as plasmonic lumped "diodes" and lumped "rectifiers" at optical frequencies that function in the optical domain the same way that their counterparts function in the microwave domain.

SUMMARY OF THE INVENTION

The inventor discloses a plasmonic lumped "diode" and lumped "rectifier" that, when exposed to an optical electric field, can provide optical field displacement current predominantly rectified in a particular polarity. Specifically, when the electric field of the optical signal is pointed to one direction in a half cycle, the displacement current can be relatively large, whereas when the electric field is reversed in the next half cycle, the displacement current is relatively small in the opposite direction. In these designs, a plasmonic nanostructure with negative permittivity is paired and juxtaposed with another nanostructure that is formed by a nonlinear optical material. By properly choosing the shape, size and the material parameters for both segments of this element, the inventor has found that the induced dipole moment (and therefore the displacement current) on this lumped element would be non-symmetric as the optical electric field varies sinusoidally with optical frequencies. This provides a mechanism for rectification of the induced dipole (or displacement current), providing a diode-like functionality for this lumped element at IR and optical frequencies. This can also lead to a direct second-harmonic generation at this element at the local level without needs for filtering out the fundamental harmonic and/or without need for phase matching concern.

DETAILED DESCRIPTION OF ILLUSTRATIVE EMBODIMENTS

The invention will be described in detail below with reference to FIGS. 1 through 6. Those skilled in the art will appreciate that the description given herein with respect to those figures is for exemplary purposes only and is not intended in any way to limit the scope of the invention. All questions regarding the scope of the invention may be resolved by referring to the appended claims.

Figure 1:
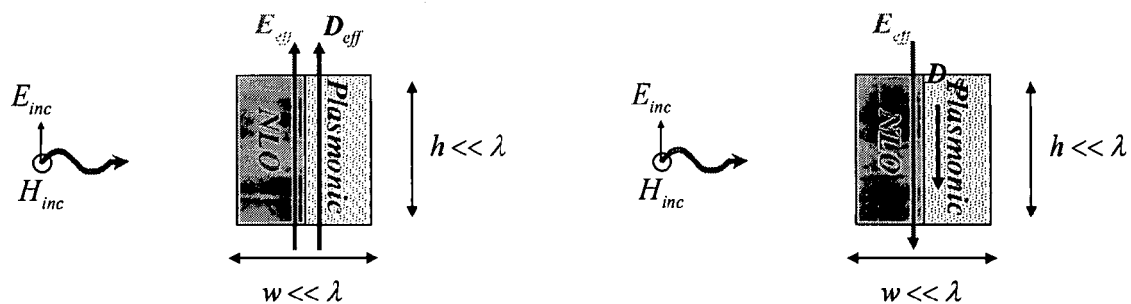
FIG. 1 illustrates the general geometry of a nanoelement as a lumped plasmonic diode/rectifier at IR and optical frequencies in accordance with the invention.

Consider a nanostructure (which is smaller than the operating wavelength) formed by mixing two parts: an epsilon-negative plasmonic material (for example, silver or gold or any other materials with negative values for real part of the permittivity), and a nonlinear optical material (NLO) (with quadratic nonlinearity such as KDP). FIG. 1 shows the sketch of such a two-part nanoelement. One of the goals of the present inventor is to choose the material properties and the geometric dimensions of this nanoelement such that when the electric field of the optical signal is pointed to one direction in a half cycle, the displacement current can be relatively large (see the left panel of FIG. 1), whereas when the electric field is reversed in the next half cycle, the displacement current is relatively small in the opposite direction (see the right panel of FIG. 1). In this sense, the resulting element will be a lumped plasmonic "diode" at IR and optical frequencies.

Figure 2:
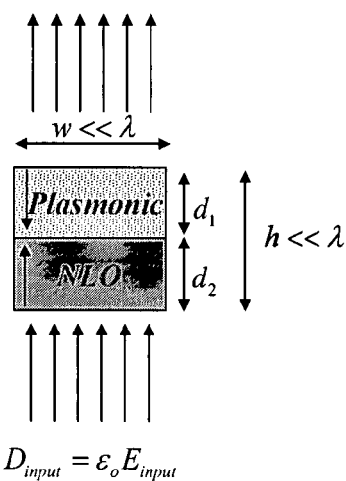
FIG. 2 illustrates the series configuration of a lumped nanoelement in accordance with the invention.

In order to achieve this goal, the following "series" configuration for this nanoelement, is considered as shown in FIG. 2. When the external (i.e., input) electric field and the electric displacement vectors excite this nanoelement (and for simplicity it is assumed that this vector is normal to the interface of this nanoelement), the normal component of the displacement vector $D_{input}$ should stay continuous across the boundaries of this nanoelement. Inside the nonlinear section of this nanoelement, one can write $D=\epsilon_o E+P=\epsilon E$ where the polarization vector P can be expressed using the nonlinear expression. Therefore, one can write $D=\epsilon_o \epsilon_{rl} E+\epsilon_o(\chi_n:EE)$, which can be expressed as $D=\epsilon_o(\epsilon_{rl}+\chi_n E)$ $E=\epsilon_o\epsilon_{NL}E$. The quadratic nonlinearity term $\chi_n$ is usually very small, i.e., $$|\chi_n E_o| \ll \epsilon_{rl}.$$

Due to the continuity of the normal component of the displacement vector, one can write $D_{input}=\epsilon_o\epsilon_{NL}E_{NL}=\epsilon_o\epsilon_{pl}E_{pl}$ where $\epsilon_{pl}$ represents the relative permittivity of plasmonic material, and $E_{NL}$ and $E_{pl}$ denote the electric fields inside the NLO and the plasmonic materials, respectively. The "effective" electric field across the entire nanoelement can be defined as $$E_{eff} \equiv \frac{E_{NL}d_1 + E_{pl}d_2}{(d_1+d_2)},$$

where $d_1$ and $d_2$ are the thicknesses of the two segments, respectively. This effective electric field can thus be expressed in terms of the input electric and displacement vectors as follows:

$$E_{eff} = \frac{1}{d_1+d_2}\left\{\left[\frac{d_1}{\varepsilon_{rl}}+\frac{d_2}{\varepsilon_{pl}}\right]E_{input} - \frac{2\chi_n d_1 E_{input}^2}{\varepsilon_{rl}^3}\right\}$$

$$= \frac{1}{d_1+d_2}\left\{\left[\frac{d_1}{\varepsilon_{rl}}+\frac{d_2}{\varepsilon_{pl}}\right]\frac{D_{input}}{\varepsilon_o} - \frac{2\chi_n d_1 D_{input}^2}{\varepsilon_{rl}^3 \varepsilon_o^2}\right\}$$

In this expression, there are two specific terms: one is the "linear term" and the other is the nonlinear term. If instead of the plasmonic material a regular conventional dielectric with positive permittivity were used, the linear term would be the dominant term when compared with the nonlinear term. However, by using the plasmonic material, one can choose the material parameters such that the linear term vanishes, since $\epsilon_{pl}$ can be negative. Therefore, if the parameters are chosen such that:

$$\frac{d_1}{\varepsilon_{rl}}+\frac{d_2}{\varepsilon_{pl}}=0, \text{ i.e., if}$$

$$\frac{d_1}{\varepsilon_{rl}}+\frac{d_2}{|\varepsilon_{pl}|}, \text{ then one obtains}$$

$$E_{eff} = -\frac{2\chi_n d_1 E_{input}^2}{\varepsilon_{rl}^3(d_1+d_2)}$$

$$= -\frac{2\chi_n d_1 D_{input}^2}{\varepsilon_{rl}^3 \varepsilon_o^2 (d_1+d_2)}.$$

Figure 3:
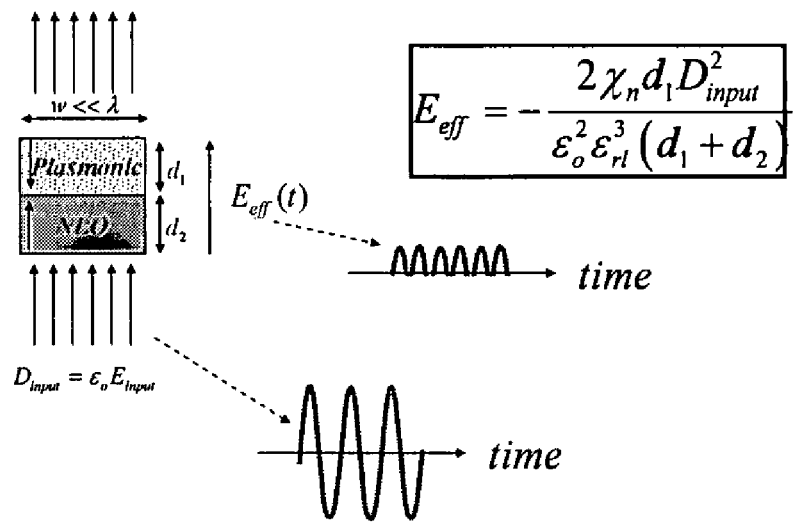
FIG. 3 is a sketch of the function of this lumped plasmonic "rectifier" at optical frequencies, generating a direct second harmonic.

This implies that the effective field across the entire nanoelement varies quadratically with input $D_{input}$. In other words, if one has a sinusoidal variation of $D_{input}=\epsilon_o E_{input}=A\sin(\omega_o t)$, the effective field across the nanoelement varies as $E_{eff(t)} \propto \sin^2(\omega_o t)$ as illustrated in FIG. 3. In other words, there is a "direct" second harmonic generation due to the "rectification" of the optical field. In this way, this lumped element will be able to "rectify" the optical electric field at the IR and optical frequencies.

Figure 4:
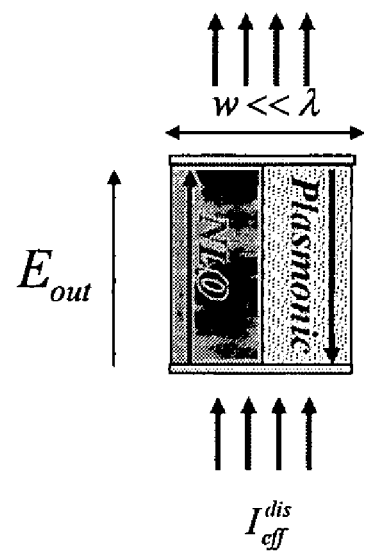
FIG. 4 illustrates the parallel configuration of such lumped nanoelements at IR and optical frequencies.
Figure 5:
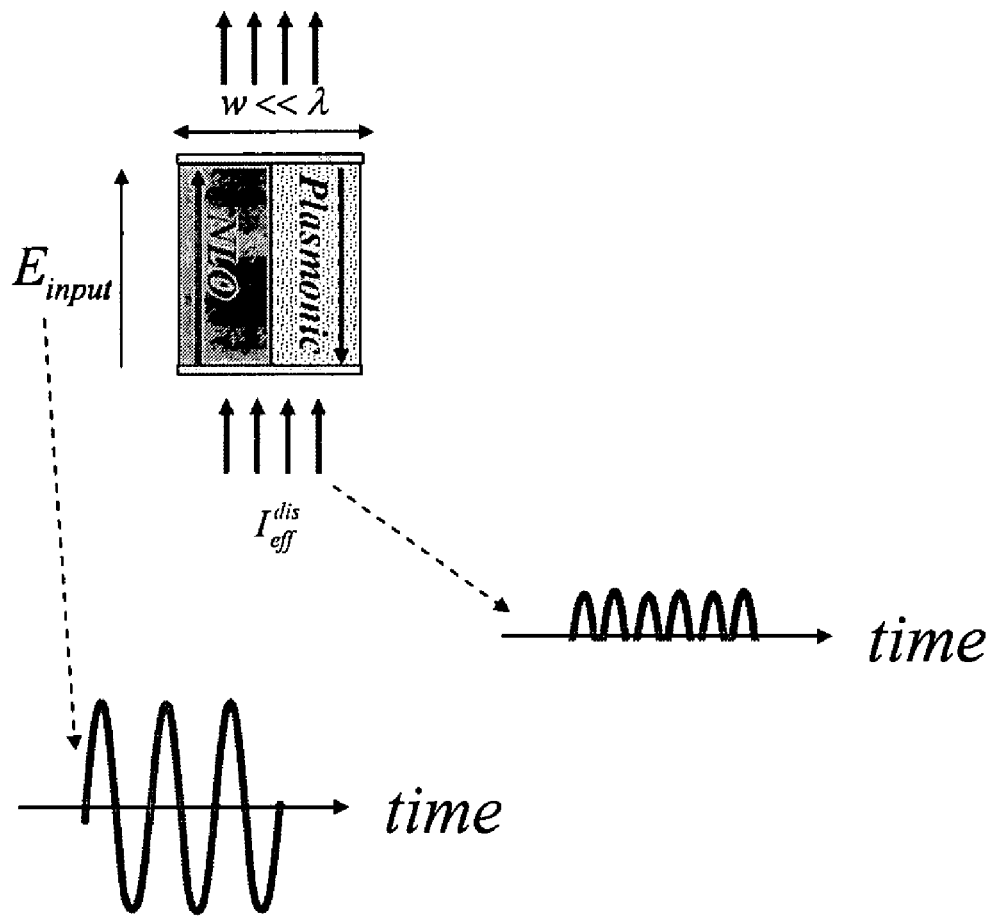
FIG. 5 is a sketch of the function of this nanoelement as a lumped rectifier at IR and optical frequencies.

One can also consider the "parallel" configuration as shown in FIG. 4, in which the two elements (one plasmonic and the other NLO) have been placed in parallel with each other, and very thin layers of materials with relatively high value of permittivity (either positive or negative) are used as the top and bottom cover layers. In this case, the input electric field $E_{input}$ can lead to an effective displacement current exiting the nanoelement, which can be described as:

$$I_{eff}^{dis} = -i\omega \frac{\varepsilon_o}{A_1+A_2}\{[\varepsilon_{rl}A_1+\varepsilon_{pl}A_2]+\chi_n A_1 E_{input}\}E_{input},$$

where $A_1$ and $A_2$ are the cross-sectional areas of the two segments of this nanoelement, and $I_{eff}^{dis} \equiv -i\omega D_{eff}^{dis}$. Here if the material parameters and geometrical dimensions are chosen such that $\epsilon_{rl}A_1+\epsilon_{pl}A_2=0$, then one will have:

$$I_{eff}^{dis} = -i\omega \frac{\varepsilon_o \chi_n A_1 E_{input}^2}{A_1+A_2},$$

which shows that the effective displacement current coming out of this nanoelement varies quadratically with the input electric field as illustrated in FIG. 5. This results in a "direct" second harmonic generation at the IR and optical frequencies without any need for filtering out the fundamental harmonic and without need for the phase matching, and also suggests that one can have a lumped "rectifier" at optical frequencies.

Figure 6:
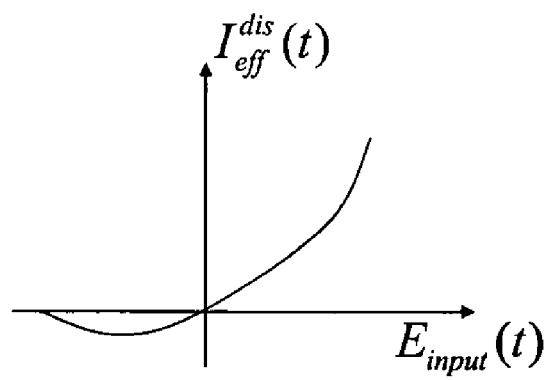
FIG. 6 illustrates the diode behavior of the lumped nanoelement shown in FIG. 4.

If instead of the above condition $\epsilon_{rl}A_1+\epsilon_{pl}A_2=0$, the material parameters are selected such that $(\epsilon_{rl}-\chi_n|E_{input}^{peak}|)A_1+\epsilon_{pl}A_2=0$ where $E_{input}^{peak}$ is the peak of the input sinusoidal electric field, then one will have $$I_{eff}^{dis} = -i\omega \frac{\varepsilon_o \chi_n A_1}{A_1 + A_2}(E_{input} + |E_{input}^{peak}|)E_{input},$$

which shows that the effective displacement current coming out of this nanoelement is not symmetric with respect to the sinusoidal variation of the input electric field. In other words, when the input electric field of the optical signal is pointed to one direction in a half cycle, the effective displacement current can be different as compared to that when the input electric field is reversed in the next half cycle, as shown in FIG. 6. This means that one has a lumped "diode" at optical frequency that provides the "diode" behavior for the displacement current.

In addition to parallel and series configurations individually, one can also consider the other combinations of plasmonic and nonlinear layers, e.g., concentric shells and coaxial shells of these materials in which the materials and the dimensions are chosen such that these shells act as lumped "diode" at optical frequency that provide "diode" behavior for the displacement current or for electric field.

Those skilled in the art will also appreciate that numerous other modifications to the invention are possible within the scope of the invention. Accordingly, the scope of the invention is not intended to be limited to the preferred embodiments described above, but only by the appended claims.

What is claimed:

1. A circuit element that provides field rectification and second harmonic generation of an applied optical electric field at infrared and optical frequencies, comprising:
   an epsilon-negative plasmonic material; and
   a nonlinear optical material juxtaposed with said epsilon-negative plasmonic material, said plasmonic material and said optical material having respective geometric dimensions and relative permittivities such that a displacement current on the circuit element is nonsymmetric as said applied optical electric field varies sinusoidally with infrared or optical frequencies, whereby when the optical electric field points to one direction in a half-cycle of the optical electric field the displacement current is large relative to the displacement current that occurs in an opposite direction when the optical electric field is reversed in a next half cycle of the optical electric field.

2. A circuit element as in claim 1, wherein the optical electric field and the displacement current are normal to an interface between the plasmonic material and the optical material so as to rectify said applied optical electric field.

3. A circuit element as in claim 1, wherein the optical electric field is applied in a direction parallel to an interface between the plasmonic material and the optical material so as to generate a second harmonic of applied infrared and optical frequencies of said applied optical electric field.

4. A circuit element as in claim 2, wherein the geometric dimensions and relative permittivities of the optical material and plasmonic material satisfy the equation $d_1/\epsilon_{rl}+d_2/\epsilon_{pl}=0$, where $d_1$ and $d2$ are the respective thicknesses of segments of the optical material and plasmonic material, $\epsilon E_{rl}$ is the relative permittivity of the optical material, and $\epsilon_{pl}$ is the relative permittivity of the plasmonic material.

5. A circuit element as in claim 3, wherein the geometric dimensions and relative permittivities of the optical material and plasmonic material satisfy the equation $\epsilon_{rl}/A_1+\epsilon_{pl}A_2=0$, where $A_1$ and $A_2$ are the respective cross-section areas of segments of the optical material and plasmonic material, $E_{rl}$ is the relative permittivity of the optical material, and $\epsilon_{pl}$ is the relative permittivity of the plasmonic material.

6. A circuit element as in claim 3, wherein the geometric dimensions and relative permittivities of the optical material and plasmonic material satisfy the equation $(\epsilon_{rl}-\chi_n|E_{input}^{peak}|)A_1+\epsilon_{pl}A_2=0$, where $A_1$ and $A_2$ are the respective cross-section areas of segments of the optical material and plasmonic material, $\epsilon_{rl}$ is the relative permittivity of the optical material, $\epsilon_{pl}$ is the relative permittivity of the plasmonic material, $\chi_n$ is a quadratic nonlinearity term, and $E_{input}^{peak}$ is the peak of the optical electric field.

* * * * *